United States Patent
Bäbler

(10) Patent No.: US 6,864,371 B2
(45) Date of Patent: Mar. 8, 2005

(54) PREPARATION OF BETA QUINACRIDONE PIGMENTS

(75) Inventor: Fridolin Bäbler, Teresópolis (BR)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 10/714,269

(22) Filed: Nov. 14, 2003

(65) Prior Publication Data

US 2004/0138457 A1 Jul. 15, 2004

Related U.S. Application Data

(60) Provisional application No. 60/429,780, filed on Nov. 27, 2003.

(51) Int. Cl.$^7$ .................. C07D 471/04; C07D 471/06
(52) U.S. Cl. ................. 546/49; 546/56; 546/57; 106/497; 106/495
(58) Field of Search ............... 546/49, 56, 57

(56) References Cited

U.S. PATENT DOCUMENTS

| | | | |
|---|---|---|---|
| 2,844,484 A | 7/1958 | Reidinger et al. | 106/288 |
| 2,844,485 A | 7/1958 | Struve | 106/288 |
| 2,844,581 A | 7/1958 | Manger et al. | 260/279 |
| 2,969,366 A | 1/1961 | Griswold et al. | 260/279 |
| 3,074,950 A | 1/1963 | Deuschel et al. | 260/279 |
| 3,272,821 A | 9/1966 | Schweizer | 260/279 |
| 4,293,719 A | 10/1981 | Velenyi et al. | 568/573 |
| 4,857,646 A | 8/1989 | Jaffe | 546/49 |
| 5,223,624 A | 6/1993 | Bäbler et al. | 546/49 |
| 5,840,901 A | 11/1998 | Bäbler | 546/497 |
| 6,013,127 A | 1/2000 | Bäbler | 106/497 |
| 6,090,196 A | 7/2000 | Bäbler | 106/497 |
| 6,225,472 B1 | 5/2001 | Bäbler | 546/49 |
| 6,264,733 B1 | 7/2001 | Bäbler | 106/495 |
| 6,406,533 B2 | 6/2002 | Bäbler | 106/495 |

FOREIGN PATENT DOCUMENTS

GB 735396 8/1955

*Primary Examiner*—Evelyn Mei Huang
(74) *Attorney, Agent, or Firm*—Kevin T. Mansfield

(57) ABSTRACT

A novel method for the preparation of a beta quinacridone pigment is described by the oxidation of 6,13-dihydroquinacridone in the presence of polyvinyl pyrrolidone, a catalyst and optionally a particulate quinacridone or particle growth inhibitor using hydrogen peroxide as the oxidant.

27 Claims, 1 Drawing Sheet

PREPARATION OF BETA QUINACRIDONE PIGMENTS

Figure 1:
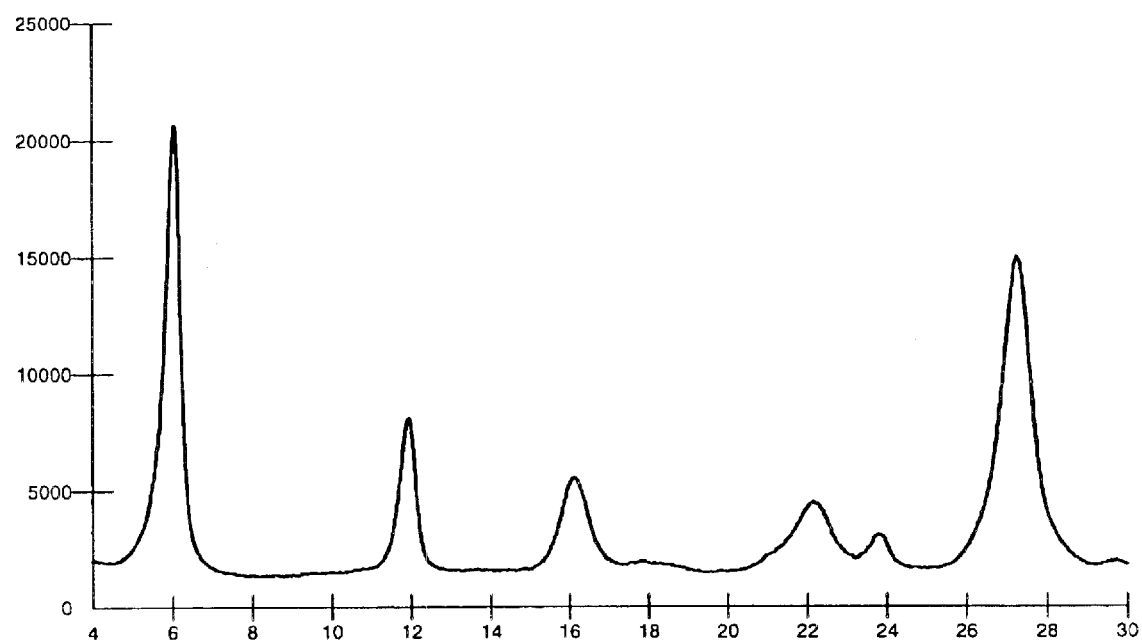

This application claims the benefit of Ser. No. 60/429780, filed on Nov. 27, 2002.

FIELD OF THE INVENTION

The present invention relates to a novel method for the preparation of a beta quinacridone pigment by the oxidation of 6,13-dihydroquinacridone in the presence of polyvinyl pyrrolidone using hydrogen peroxide as the oxidant.

BACKGROUND OF THE INVENTION

The polymorphism of quinacridone pigments is well known. For example quinacridone, also referred to as 5,12-dihydroquino-[2,3-b]-acridine-7,14-dione of the formula

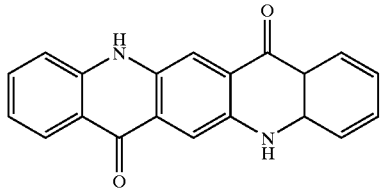

(I)

is known to exist in three major polymorph modifications.

The alpha (U.S. Pat. No. 2,844,484) and gamma (U.S. Pat. No. 2,844,581, U.S. Pat. No. 2,969,366, U.S. Pat. No. 3,074,950 and U.S. Pat. No. 5,223,624) polymorphs are bluish or yellowish red pigments. The beta polymorph is described in U.S. Pat. No. 2,844,485 as a violet form and in U.S. Pat. No. 4,857,646 as a magenta form while the delta polymorph obtained by sublimation of quinacridone is described as a yellowish red quinacridone in U.S. Pat. No. 3,272,821. Since the alpha and delta forms are unstable, only the red gamma, and the violet and magenta beta quinacridone are of commercial interest.

Several routes are described for the preparation of quinacridone. Numerous publications describe the oxidation of 6,13-dihydroquinacridone to quinacridone. For example, U.S. Pat. No. 5,840,901 describes the oxidation of 6,13-dihydroquinacridone using hydrogen peroxide as the oxidant. This unique process provides an economic and environmentally friendly method for the preparation of quinacridone pigments.

Additionally, the process offers the preparation of quinacridones and its solid solutions in its desired crystal modification as for example the beta or the gamma quinacridone. For example, U.S. Pat. No. 6,013,127 describes a process for the preparation of a quinacridone/6,13-dihydroquinacridone solid solution in its gamma crystal form. Such products show outstanding pigment properties. Generally, a pigmentary form is obtained in the synthesis step without the need of an additional finishing step.

U.S. Pat. No. 6,225,472 and U.S. Pat. No. 6,406,533 describe novel 6,13-dihydroquinacridone derivatives, which can direct and control the growth and/or crystal phase of pigment particles.

U.S. Pat. No. 6,264,733 describes new pigment particle growth and/or crystal phase directors of the formula $(MO_3S)_m$-Q-$(CH_2-(X)-(Y)_n)_o$ (II), wherein Q represents a pigment moiety, M represents a metal cation, quaternary N cation or H, X is an aromatic group or an aliphatic heterocyclic group with at least one 5 atom or 6 atom ring or a heteroaromatic group with at least one 6 atom ring and which is not a phthalimido group, Y is a sulfonic acid or carboxylic acid or salt thereof; m and n independent from each other represent a number from zero to 2.5; and o is a number from 0.05 to 4.

Although beta quinacridone can be advantageously produced by these known methods the pigments prepared by such processes are opaque or semi opaque and still need an after treatment or finishing like solvent treatment, further grinding or kneading or even precipitation from mineral acids like concentrated sulfuric acid to get a very small particle size C.I. Pigment Violet 19 in its desired color characteristics, high color strength and high transparency.

Furthermore, depending on the reaction conditions the beta quinacridone is often obtained in mixture with a small quantity of the red gamma or alpha quinacridone present, leading to a hue shift and lower chroma.

The present process describes a new route for the preparation of a pure single phase direct pigmentary beta quinacridone pigment by the oxidation of 6,13-dihydroquinacridone, in that the process is carried out in the presence of a specific polymer or a specified mixture of polymers and optionally in the presence of a small particulate quinacridone as a seed.

Thus, the inventive process is valuable since it offers a new viable environmentally friendly and economical route for the preparation of new violet quinacridone pigments.

DETAILED DESCRIPTION OF A PREFERRED EMBODIMENT

It has now surprisingly been found that quinacridone in improved beta pigmentary form can be obtained by the oxidation of 6,13-dihydroquinacridone in an aqueous basic methanol media using hydrogen peroxide as the oxidant and an anthraquinone mono or disulfonic acid as the catalyst in the presence of polyvinyl pyrrolidone and optionally a small particulate quinacridone as a seed.

Thus, the inventive process is valuable since it allows the manufacturer to produce high performance, high chroma beta quinacridone pigments in an economical and environmentally friendly manner without further finishing or solvent treatment. The commercial significance is high.

The present invention relates to a process for preparing a quinacridone pigment of the formula

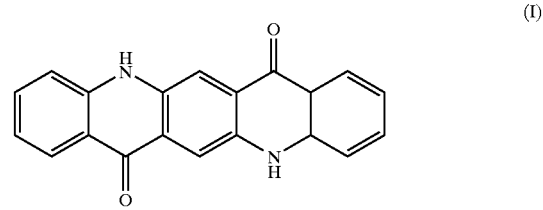

(I)

in its beta crystal phase, wherein a salt of 6,13-dihydroquinacridone of the formula

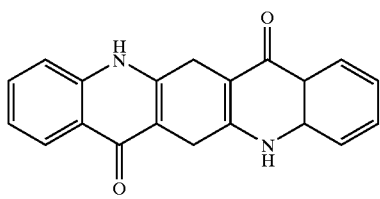

(III)

is oxidised with hydrogen peroxide in the presence of a catalyst and 0.2 to 4% by weight, preferably 0.5 to 3% by weight, based on the 6,13-dihydroquinacridone, of polyvinyl pyrrolidone.

Preferably the polyvinyl pyrrolidone has a molecular weight in the range of 9,000 to 350,000, most preferably 40,000 to 50,000, and it is added before, during or after the 6,13-dihydroquinacridone salt formation, most preferably before the salt formation.

Generally, the salt of the 6,13-dihydroquinacridone of formula (III) is a mono- or preferably di-alkali metal salt, or a mixture thereof. Most preferred are the disodium and/or dipotassium salts.

For example, the 6,13-dihydroquinacridone salt is prepared by stirring the 6,13-dihydroquinacridone in a basic medium, for example a mixture of water, alcohol and a base, typically in the presence of the polyvinyl pyrrolidone, at a temperature of 30° C. or above, preferably from 40 to 100° C., and most preferably from 50° C. and the corresponding reflux temperature, for 5 minutes to 2½ hours, preferably 20 minutes to 1½ hours.

Furthermore, the presence of small particulate quinacridone during the 6,13-dihydroquinacridone salt formation and following oxidation reaction can have additional beneficial effects for the generation of the inventive direct pigmentary violet beta quinacridone pigment.

Preferably, such small particulate quinacridone has a particle size of less than 0.2 µm and is in the beta crystal phase as obtained for example by known processes from sulfuric acid precipitation or it is a nanosize quinacridone in mixture with other polymers, like naphthalene sulfonic acid formaldehyde polymers as described in example 2 and more in detail in a concurrently filed provisional patent application 60/430,522.

Such small particulate quinacridone is added at a concentration of 0.1 to 10% by weight, preferably 0.5 to 5% by weight, based on 6,13-dihydroquinacridone.

Without limiting this invention to any particular theory, it is believed that the nanosize or small particle size beta quinacridone pigment particles can act as seeds for the pigments to be synthesized and the polyvinyl pyrrolidone can adhere to the synthesized pigment molecule and by doing so can further direct the crystal growth and crystal phase. The term "directing the crystal growth" refers to controlling the synthesis of pigment particles to have a suitable pigmentary size as well as directing the growth of the crystals to generate particles of a specifically desired shape, such as platelet, needle, cubic, leaflet, prismatic and other geometric forms, in a desired crystal phase.

Generally, the oxidation is carried out in a reaction medium obtained by combining a slurry, which consists essentially of the 6,13-dihydroquinacridone, polyvinyl pyrrolidone, optionally a small particulate quinacridone, the catalyst, a base and a suitable liquid phase, with an aqueous solution of hydrogen peroxide.

In general, a suitable liquid phase is any liquid media which promotes the oxidation reaction, and which does not react to a significant extent with the hydrogen peroxide oxidizing agent. Commonly, the liquid phase is a mixture of a lower alcohol and water which contains 20 to 750 parts, preferably 40 to 600 parts of water, and 50 to 750 parts, preferably 100 to 600 parts, of alcohol per 100 parts 6,13-dihydroquinacridone; all parts being parts by weight.

The alcohol is generally a lower alcohol, for example a $C_1$–$C_3$alkanol, preferably methanol. The reaction medium is preferably substantially free of other organic solvents. However, organic solvents are tolerated in the reaction medium as long as they do not impair the 6,13-dihydroquinacridone salt generation or the oxidation reaction.

Any base capable of forming the salt of the 6,13-dihydroquinacridone is useful in the reaction medium. Preferably, the base is an alkali metal hydroxide, most preferably sodium or potassium hydroxide. In certain instances, it is advantageous to use a mixture of sodium hydroxide and potassium hydroxide.

The molar ratio of the base to 6,13-dihydroquinacridone is typically from 1 to 8 moles of base per mole of the 6,13-dihydroquinacridone, preferably from 2.2 to 7 moles of base per mole of 6,13-dihydroquinacridone.

The generation of the 6,13-dihydroquinacridone salt is observable under the light microscope by the formation of crystals of the 6,13-dihydroquinacridone salt. Depending on the reaction conditions and the kind of base, the salt is generally in the form of needles, prisms, cubes or platelets.

Additionally, it is advantageous to add a particle growth inhibitor before or after the 6,13-dihydroquinacridone salt generation to control the pigment particle size of the oxidized quinacridone pigment. Particle growth inhibitors, also known as anti flocculating or rheology improving agents, are well known. Suitable particle growth inhibitors include, for example, phthalimido methyl quinacridone, imidazolyl methyl quinacridone, pyrazolyl methyl quinacridone, quinacridone sulfonic acid and its salts, for example the aluminium salt.

For achieving an optimum effect, the particle growth inhibitor is added in an amount of 0.05 to 8% by weight, preferably 0.1 to 5% by weight, based on 6,13-dihydroquinacridone, preferably prior to oxidation after or before the 6,13-dihydroquinacridone salt generation.

For various reasons and particularly to avoid potential side reactions as well as for a more controllable process, the oxidation reaction is preferably carried out under an inert gas flow, for example an argon or nitrogen flow.

In an optimized process, the oxidation is carried out by combining an aqueous solution of the hydrogen peroxide oxidant with a slurry of the 6,13-dihydroquinacridone in a basic mixture of aqueous alcohol, polyvinyl pyrrolidone, base and optionally with a particulate quinacridone and a particle growth inhibitor over a time interval of from 5 minutes to 6 hours, preferably over 30 minutes to 3½ hours, and subsequently maintaining the reaction medium at an elevated temperature with stirring for a period of time to complete the oxidation and promote pigment recrystallization. Preferably, the reaction medium is maintained at a temperature of 50° C. or above, most preferably at reflux temperature, for 5 minutes to 5 hours, preferably 10 minutes to 4 hours, after the addition of hydrogen peroxide. The pigment is then isolated by filtration, washing with alcohol followed by hot water and drying. The base and the alcohol can be easily regenerated from the filtrate.

The aqueous solution of hydrogen peroxide generally contains from 1 to 50% by weight, preferably 5 to 30% by weight, and most preferably 10 to 25% by weight, of hydrogen peroxide.

The oxidation of the 6,13-dihydroquinacridone salt to the corresponding quinacridone by hydrogen peroxide is visually followed by the color change of the reaction mixture. In general, a small excess of the hydrogen peroxide is used. The molar ratio of hydrogen peroxide to 6,13-dihydroquinacridone is, for example, 1.1 to 5 moles, preferably 1.2 to 3.5 moles, of hydrogen peroxide per mole of 6,13-dihydroquinacridone.

The presence of an oxidation-promoting amount of the catalyst during the oxidation step leads to a higher yield of quinacridone. Additionally, the presence of the catalyst under the oxidation conditions described above, results in a quinacridone product that contains only small amounts of quinacridonequinone, for example containing less than 3% by weight of quinacridonequinone. However, minor amounts of quinacridonequinone are tolerated in the product as long as its presence does not substantially reduce the saturation of the final quinacridone pigment.

Any compound capable of catalyzing the oxidation of 6,13-dihydroquinacridone under the present reaction conditions can be utilized as the catalyst. Particularly suitable catalysts used in the inventive process are, for example, the quinone compounds used for the air oxidation of 6,13-dihydroquinacridone to quinacridone. Such quinone catalysts are well known in the art. In particular, suitable catalysts include anthraquinone compounds, especially anthraquinone, and anthraquinone sulfonic acid derivatives, such as anthraquinone-2,7-disulfonic acid or anthraquinone-2-sulfonic acid, or salts thereof, in particular the sodium or potassium salts, especially anthraquinone-2,7-sulfonic acid, disodium or dipotassium salt. The quinone catalyst is present in the reaction medium in an amount effective to catalyze the oxidation reaction, for example from 0.005 to 0.15 times the weight of 6,13-dihydroquinacridone, and most preferably 0.01 to 0.05 times the weight of 6,13-dihydroquinacridone.

Without limiting this invention to any particular theory, it is believed that the quinone catalyst acts to oxidize the 6,13-dihydroquinacridone and is itself reduced to the corresponding leuco compound, which is then regenerated by the hydrogen peroxide.

Depending on the composition of the liquid phase, the recrystallization time and temperature, as well as the use or nonuse of particle growth inhibitors, the chemical structure of such particle growth inhibitor, transparent smaller particle size or opaque larger particle size beta quinacridone crystals in a platelet, needle, cubic, leaflet, prismatic and other geometric forms are generated. Lower temperatures and the use of particle growth inhibitors favor a transparent product, while higher temperatures and without particle growth inhibitors favor a more opaque product.

Generally, the beta quinacridone crystals generated according to the inventive process are in a platelet, leaflet shape. The specific surface area of the beta quinacridones prepared according to the present process are in the range of 2 to 30 $m^2/g$ without the use of a particle growth inhibitor, and 30 to 65 $m^2/g$ when the oxidation reaction is carried out in the presence of a particle growth inhibitor.

Additionally, the inventive process selectively oxidizes the 6,13-dihydroquinacridone to the corresponding quinacridone easily. The end product normally contains less than 2% by weight of the unreacted 6,13-dihydroquinacridone and less than 3% by weight of the over oxidized quinacridonequinone. Typically, at least 95% by weight, usually 97.5% by weight and above, of the dihydroquinacridone is converted to the corresponding quinacridone in its beta crystal phase.

Although the oxidation is carried out in a heterogeneous reaction medium, the inventive process provides quinacridone pigments with a narrow particle size distribution. Thus, due to their high purity and desirable narrow particle size distribution, the obtained quinacridone pigments manifest outstanding pigment properties, such as, for example, a high chroma.

Depending on the end use, it may be advantageous to add texture improving agents and/or rheology improving agents, for example before the isolation of the pigment, preferably by blending into the aqueous presscake. Suitable texture improving agents are, in particular, fatty acids of not less than 12 carbon atoms, for example lauric, stearic or behenic acid or the amides or metal salts thereof, preferably calcium or magnesium salts, as well as plasticizers, waxes, resin acids such as abietic acid or metal salts thereof, colophonium, alkyl phenols or aliphatic alcohols such as stearyl alcohol or vicinal diols such as dodecanediol-1,2, and also modified colophonium/maleate resins or fumaric acid/colophonium resins or polymeric dispersants. The texture improving agents are preferably added in amounts of 0.1 to 30% by weight, most preferably of 2 to 15% by weight, based on the final product.

Suitable rheology improving agents are for example known anti flocculating agents, such as quinacridone derivatives like for example phthalimido methyl-, imidazolyl methyl- or pyrazolyl methyl-quinacridone or pigment sulfonic acids, which are added preferably in amounts of 2 to 10% by weight, most preferably of 3 to 8% by weight, based on the final product.

Furthermore it is possible to add other colorants like dyes, organic or inorganic pigments or effect pigments or additives such as surfactants, antifoaming agents, inorganic fillers such as talc or mica, UV-absorber, light stabilizers like the HALS, resins or waxes before, during or after the isolation process. The amount of such additives is generally 0 to 40% by weight, preferably 0.1 to 20% by weight, based on the amount of pigment.

The present beta quinacridone pigment is suitable as coloring matter for inorganic or organic substrates. It is highly suitable for coloring high molecular weight materials, which can be processed to fibers, casted and molded articles or which are used in ink and coating compositions such as solvent or water based coatings, conventionally employed in the automobile industry, especially in acrylic/melamine resin, alkyd/melamine resin or thermoplastic acrylic resin systems, as well as in powder coatings and UV/EB cured coating systems.

Suitable high molecular weight organic materials include thermoplastics, thermoset plastics or elastomers, for example, cellulose ethers; cellulose esters such as ethyl cellulose; linear or crosslinked polyurethanes; linear, crosslinked or unsaturated polyesters; polycarbonates; polyolefins such as polyethylene, polypropylene, polybutylene or poly-4-methylpent-1-ene; polystyrene; polysulfones; polyamides; polycycloamides; polyimides; polyethers; polyether ketones such as polyphenylene oxides; and also poly-p-xylene; polyvinyl halides such as polyvinyl chloride, polyvinylidene chloride, polyvinylidene fluoride or polytetrafluoroethylene; acrylic polymers such as polyacrylates, polymethacrylates or polyacrylonitrile; rubber; silicone polymers; phenol/formaldehyde resins; melamine/formaldehyde resins; urea/formaldehyde resins; epoxy resins; styrene butadiene rubber; acrylonitrile-butadiene rubber or chloroprene rubber; singly or in mixtures.

Generally, the inventive beta quinacridone pigment is used in an effective pigmenting amount, for example, of 0.01 to 30% by weight (up to 70% by weight for masterbatches), preferably 0.1 to 10% by weight, based on the weight of the high molecular weight organic material to be pigmented. Thus, the present invention also relates to a pigmented plastic composition, which comprises a plastic material, and an effective pigmenting amount of a beta quinacridone pigment prepared according to a process of the present invention, and to a process for preparing said pigmented plastic compositions.

The present beta quinacridone pigment is easily dispersible and can be readily incorporated into organic matrixes to provide homogenous colorations possessing high saturation, high color strength and excellent light and weather fastness properties.

The high molecular weight organic materials are pigmented with the pigments of the present invention by mixing the pigments, if desired in the form of a masterbatch, into substrates using high shear techniques including roll mills or a mixing or grinding apparatus. The pigmented material is then brought into the desired final form by known methods, such as calendering, pressing, extruding, brushing, casting or injection molding.

The following examples further describe embodiments of this invention. In these examples all parts given are by weight unless otherwise indicated. The X-ray diffraction patterns are measured on a RIGAKU GEIGERFLEX diffractometer type D/MaxII v BX. The surface areas are measured by the BET method.

EXAMPLES

Example 1

A one-liter flask equipped with a thermometer, stirrer and condenser is charged with 50 g 6,13-dihydroquinacridone, 180 ml methanol, 1 g polyvinyl pyrrolidone powder (Luviskol® K-30/BASF) are stirred at 20 to 27° C. for 10 minutes. 73 g 50% aqueous sodium hydroxide are added. The mixture is stirred under a slow flow of nitrogen at 50–53° C. for 50 minutes then heated to reflux. 1.2 g 2,7-anthraquinone disulfonic acid is added as catalyst. 76 g of an aqueous 18.9% hydrogen peroxide solution is added into the reaction mixture with a peristaltic pump at a pumping rate of 0.4 ml/minute. The resulting pigment suspension is further stirred for 10 minutes at reflux then diluted with 100 ml cold water and filtered. The presscake is washed with hot water then dried, yielding a bronze colored large particle size beta quinacridone.

Comparative Example 1

Example 1 is repeated, however, with the difference that no polyvinyl pyrrolidone is added. Red gamma quinacridone is obtained.

Example 2

A one-liter flask equipped with a stirrer, thermometer, condenser and drying tube is charged with 200 ml concentrated (95–98%) sulfuric acid. 31.2 g unsubstituted quinacridone (Cromophtal® Red 2020, Ciba Specialty Chemicals Inc.) is added at a temperature below 45° C. and the mixture is stirred for 10 minutes at 40–45° C. to dissolve the pigment.

39.7 g of a wet naphthalene sulfonic acid sodium salt presscake with a solid content of 58%, a mixture containing 80% 1-naphthalene sulfonic acid sodium salt and 20% 2-naphthalene sulfonic acid sodium salt (Shanghai Shen Li Chemical Factory) is added at a temperature below 45° C. and the mixture is stirred for 15 minutes at 40 to 45° C. followed by the rapid addition of 3.2 g para formaldehyde. The reaction mixture is stirred for one hour at 58–60° C., then poured into 2.5 l of ice water. The violet precipitate is stirred for 1 hour at 5–20° C., then filtered. The residue is washed with water to a pH of 2.5 and kept as presscake with a solid content of 13% by weight.

Around 0.5 g of the press cake are reslurried in 20 ml hot water yielding a bluish red colored liquid. It is filtered to remove little aggregated material. The filtrate is red and appears a dye solution. However, the electron micrograph shows the quinacridone in nanosize particle form with an average particle size of 10 to 25 nm.

Example 3

A one liter flask equipped with a thermometer, stirrer and condenser is charged with 50 g 6,13-dihydroquinacridone, 200 ml methanol, 1 g polyvinyl pyrrolidone powder (Luviskole K-30, BASF) and 7 g of the aqueous presscake of the nanosize quinacridone naphthalene sulfonic acid formaldehyde polymer mixture according to Example 2 are stirred at 20–27° C. for 10 minutes. 50 g 50% aqueous sodium hydroxide are added. The mixture is stirred under a slow flow of nitrogen at 50–53° C. for one hour. 0.8 g anthraquinone mono sulfonic acid sodium salt is added as catalyst and the reaction mixture is heated to reflux for 10 minutes. 76 g of an aqueous 18.9% hydrogen peroxide solution are added into the reaction mixture with a peristaltic pump at a pumping rate of 0.4 ml/minute. Then after 25 minutes addition time 1.6 g phthalimidomethyl-quinacridone are introduced into the reaction mixture followed by continuing the hydrogen peroxide addition while maintaining reflux and a slow nitrogen flow. The resulting violet suspension is further stirred for 10 minutes at reflux then diluted with 100 ml cold water and filtered. The presscake is washed with hot water then dried, yielding a small particle size violet beta quinacridone.

The product shows a high purity and less than 0.1% remaining 6,13-dihydro-quinacridone as determined spectrophotometrically. The X-ray diffraction pattern of the pigment shows the characteristics of a beta quinacridone. When incorporated into automotive paints, the product leads to a strong violet color dispersion with excellent rheological properties and an attractive color appearance when drawn on a contrast carton, which dispersion can easily be sprayed on metallic panels generating coatings of excellent durability (a topcoat may then further be applied in conventional manner, for example by the wet-on-wet technique).

Example 4

A one liter flask equipped with a thermometer, stirrer and condenser is charged with 50 G 6,13-dihydroquinacridone, 200 ml methanol, 1 g polyvinyl pyrrolidone powder (Luviskol® K-30, BASF) and 7 g of the aqueous presscake of the nanosize quinacridone naphthalene sulfonic acid formaldehyde polymer mixture according to Example 2, are stirred at 20–27° C. for 10 minutes. 73 g 50% aqueous sodium hydroxide are added. The mixture is stirred under a slow flow of nitrogen at 50–53° C. for 30 minutes. 4.6 g of a 37% aqueous solution of anthraquinone-2,7-disulfonic acid disodium salt is added as catalyst followed by 10 ml water and the reaction mixture is heated to reflux for 40 minutes. 79 g of an aqueous 18.2% hydrogen peroxide solution are added into the reaction mixture with a peristaltic pump at a pumping rate of 0.4 ml/minute. Then after 20 minutes addition time 2.3 g phthalimido methyl-quinacridone and after another 70 minutes 0.3 g phthalimido methyl-quinacridone are introduced into the reaction mixture followed by continuing the hydrogen peroxide addition while maintaining reflux and a slow nitrogen flow. The resulting violet suspension is further stirred for 10 minutes at reflux then diluted with 100 ml cold water and filtered. The presscake is washed with hot water then dried, yielding a violet quinacridone.

The product shows a high purity and less then 0.1% remaining 6,13-dihydro-quinacridone as determined spectrophotometrically. The x-ray diffraction pattern of the pigment shows the characteristics of a beta quinacridone. The specific surface area as measured by the BET method is 52 $m^2/g$. Incorporated in automotive paints or plastics the product gives a strong violet color with excellent pigment properties.

Example 5

A small particle size beta quinacridone with an average particle size of 0.05 to 0.1 μm as described in U.S. Pat. No. 2,844,485 is prepared according to U.S. Pat. No. 3,607,336 by a high turbulence drowning process from concentrated sulfuric acid precipitation starting from a beta quinacridone crude with an average particle size of 2 to 8 μm, yielding a violet particulate quinacridone having an average particle size in the range of 0.005 to 0.2 μm, which is kept as presscake.

Example 6

A one liter flask equipped with a thermometer, stirrer and condenser is charged with 50 g 6,13-dihydroquinacridone, 200 ml methanol, 1 g polyvinyl pyrrolidone powder (Luviskol® K-30, BASF) and 4 g of the aqueous presscake with a solid content of 20% by weight of the particulate quinacridone according to Example 5 are stirred at 20–27° C. for 10 minutes. 77 g 50% aqueous sodium hydroxide are added. The mixture is stirred under a slow flow of nitrogen at 50–53° C. for 30 minutes. 4.6 g of a 37% aqueous solution of anthraquinone-2,7-disulfonic acid disodium salt is added as catalyst followed by 10 ml water and the reaction mixture is heated to reflux for 30 minutes. 79 g of an aqueous 18.2% hydrogen peroxide solution are added into the reaction mixture with a peristaltic pump at a pumping rate of 0.4 ml/minute, whereby after 5 minutes addition time 3.2 g phthalimido methyl-quinacridone are introduced into the reaction mixture followed by continuing the hydrogen peroxide addition while maintaining reflux and a slow nitrogen flow. The resulting violet suspension is further stirred for 10 minutes at reflux then diluted with 100 ml cold water and filtered. The presscake is washed with hot water then dried, yielding a violet quinacridone with an average particle size of 0.05 to 0.25 μm.

The product shows a high purity and less than 0.1% remaining 6,13-dihydro-quinacridone as determined spectrophotometrically. FIG. 1 shows the X-ray diffraction pattern of the pigment with the characteristic pattern of a beta quinacridone:

| Scattering Angle [°2θ] | Relative Intensity [%] |
|---|---|
| 6.0 | 100 |
| 11.9 | 39 |
| 16.1 | 26 |
| 17.8 | 9 |
| 22.1 | 21 |
| 23.8 | 15 |

-continued

| Scattering Angle [°2θ] | Relative Intensity [%] |
|---|---|
| 27.3 | 71 |
| 29.7 | 9 |

Incorporated in automotive paints or plastics, the product produces a strong violet color with excellent pigment properties.

Example 7

63.0 g of polyvinyl chloride, 3.0 g epoxidized soy bean oil, 2.0 g of barium/cadmium heat stabilizer, 32.0 g dioctyl phthalate and 1.0 g of the violet beta quinacridone pigment according to Example 6 are mixed together in a glass beaker using a stirring rod. The mixture is formed into a soft PVC sheet with a thickness of about 0.4 mm by rolling for 8 minutes on a two roll laboratory mill at a temperature of 160° C., a roller speed of 25 rpm and friction of 1: 1.2, by constant folding, removal and feeding. The resulting soft PVC sheet is colored in an attractive violet shade and has excellent fastness to heat, light and migration.

Example 8

5 g of the violet beta quinacridone pigment according to Example 4, 2.65 g Chimassorb® 944LD (hindered amine light stabilizer), 1.0 g Tinuvin® 328 (benzotriazole UV absorber) and 2.0 g Irganox® B-215 Blend (antioxidant, all from Ciba Specialty Chemicals Inc.), are mixed together with 1000 g of high density polyethylene at a speed of 175–200 rpm for 30 seconds after flux. The fluxed, pigmented resin is chopped up while warm and malleable, and then fed through a granulator. The resulting granules are molded on an injection molder with a 5 minute dwell time and a 30 second cycle time at temperatures of 200, 250 and 300° C. Homogeneously colored chips, which show a violet color with an excellent light stability and practically no color differences between the different temperatures, are obtained.

Example 9

This Example illustrates the incorporation of the inventive beta quinacridone according to Example 3 into an automotive paint system.

Millbase Formulation

A pint jar is charged with 30.9 g acrylic resin, 16.4 g AB dispersant consisting of 45% of an acrylic resin in toluene, and 42.8 g solvent (Solvesso™ 100 from American Chemical). 30.0 g beta quinacridone according to Example 6 and 980 g of 4 mm diameter steel diagonal rods are added. The jar is shaken on a Skandex™ shaker for 5 hours. The millbase contains 25.0% pigment with a pigment/binder ratio of 0.5.

Masstone Color 48.9 g of the above millbase, 71.7 g of a clear 47.8% solids unpigmented resin solvent solution containing a melamine resin catalyst, a non-aqueous dispersion resin and a UV absorber, and 29.4 g of a clear unpigmented 58% solids unpigmented polyester urethane resin solvent solution, are mixed and diluted with a solvent mixture comprising 76 parts xylene, 21 parts butanol and 3 parts methanol to a spray viscosity of 20–22 seconds as measured by a #2 Fisher Cup. The resin/pigment dispersion is sprayed onto a panel twice at 1½ minute intervals as basecoat. After 2 minutes, the clearcoat resin is sprayed twice at 1½ minute intervals onto the basecoat. The sprayed panel is then flashed with air in a flash cabinet for 10 minutes and then "baked" in an oven at 129° C. for 30 minutes, yielding a violet colored panel. The coated panel has excellent weatherability.

Example 10

1000 g of polypropylene granules (Daplen PT-55®, Chemie Linz) and 10 g of the beta quinacridone pigment according to Example 4 are thoroughly mixed in a mixing drum. The granules so obtained are melt-spun at 260–285° C. to violet filaments of good light fastness and textile fiber properties.

I claim:

1. A process for preparing a beta quinacridone of formula (I)

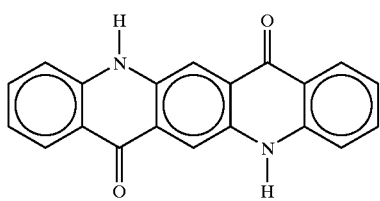

by the oxidation of a salt of a corresponding 6,13-dihydroquinacridone of formula (III)

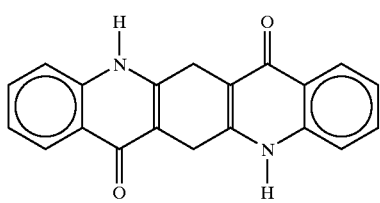

which comprises oxidizing the 6,13-dihydroquinacridone salt with hydrogen peroxide in the presence of a catalyst and 0.2 to 4% by weight, based on the 6,13-dihydroquinacridone of a polyvinyl pyrrolidone.

2. A process according to claim 1, wherein 0.5 to 3% by weight based on the 6,13-dihydroquinacridone of a polyvinyl pyrrolidone is present.

3. A process of claim 1, wherein the 6,13-dihydroquinacridone salt is an alkali metal salt.

4. A process of claim 3, wherein the 6,13-dihydroquinacridone salt is a disodium or dipotassium salt.

5. A process of claim 1, wherein particulate quinacridone having an average particle size of below 0.2 micron and which is in the beta crystal phase is present during oxidation.

6. A process of claim 5, wherein a mixture of the particulate quinacridone as a nanosize quinacridone and a naphthalene sulfonic acid formaldehyde polymer is present during oxidation.

7. A process of claim 5, wherein the particulate quinacridone is prepared from sulfuric acid precipitation.

8. A process of claim 5, wherein the particulate quinacridone is present at a concentration from 0.1 to 10 percent based on 6,13-dihydroquinacridone.

9. A process of claim 1, wherein the oxidation step is carried out by combining a slurry consisting essentially of the 6,13-dihydroquinacridone salt, the catalyst, the polyvinyl pyrrolidone, a base and a liquid phase, with an aqueous solution of hydrogen peroxide.

10. A process of claim 9, wherein the liquid phase consists essentially of from about 20 to 750 parts by weight of water and from about 50 to 750 parts by weight of a lower alcohol per 100 parts by weight of 6,13-dihydroquinacridone.

11. A process of claim 10, wherein the liquid phase consists essentially of from 40 to 600 parts by weight of water and from 100 to 600 parts by weight of the alcohol per 100 parts by weight of 6,13-dihydroquinacridone.

12. A process of claim 10, wherein the alcohol is a $C_1$ to $C_3$ alcohol.

13. A process of claim 12, wherein the alcohol is methanol.

14. A process of claim 9, wherein wherein the base is an alkali metal hydroxide, which is present in an amount of from 1 to 8 moles per mole of the 6,13-dihydroquinacridone.

15. A process of claim 14, wherein the alkali metal hydroxide is present in an amount of from 2.2 to 7 moles per mole of the 6,13-dihydroquinacridone.

16. A process of claim 14, wherein the alkali metal hydroxide is sodium or potassium hydroxide, or a mixture thereof.

17. A process of claim 9, wherein the catalyst is a quinone compound.

18. A process of claim 17, wherein the catalyst is selected from the group consisting of anthraquinone, anthraquinone monosulfonic acid and anthraquinone disulfonic acid, or a salt thereof.

19. A process of claim 18, wherein the catalyst is anthraquinone-2-sulfonic acid or anthraquinone-2,7-disulfonic acid or its sodium or potassium salts.

20. A process of claim 9, wherein the catalyst is present in an amount of from 0.005 to 0.15 times the weight of the 6,13-dihydroquinacridone.

21. A process of claim 9, wherein the oxidation step is carried out by combining a 1 to 50 percent by weight aqueous solution of hydrogen peroxide with a slurry consisting essentially of the 6,13-dihydroquinacridone, the catalyst, the base and the liquid phase.

22. A process of claim 21, wherein the aqueous hydrogen peroxide solution has a concentration of 5 to 30 weight percent of hydrogen peroxide.

23. A process of claim 9, wherein 1.1 to 5 moles of the hydrogen peroxide are combined per mole of 6,13-dihydroquinacridone.

24. A process of claim 9, wherein the aqueous solution of hydrogen peroxide is added to the slurry over a time interval of from 5 minutes to 6 hours at elevated temperature and the reaction medium is subsequently maintained, with stirring, at an elevated temperature for from 5 minutes to 4 hours to complete the oxidation and promote pigment recrystallization.

25. A process of claim 9, wherein the reaction medium is maintained at a temperature of from 50° C. to reflux temperature for from 5 minutes to 2 hours.

26. A process of claim 9, wherein the oxidation step is carried out in the presence of from 0.05 to 10% by weight based on the 6,13-dihydroquinacridone of a particle growth inhibitor.

27. A process of claim 26, wherein said particle growth inhibitor is phthalimidomethyl-, imidazolyl methyl-, pyrazolyl methyl-quinacridone, quinacridone mono sulfonic acid and its salts.

* * * * *

UNITED STATES PATENT AND TRADEMARK OFFICE
CERTIFICATE OF CORRECTION

PATENT NO. : 6,864,371 B2
DATED : March 8, 2005
INVENTOR(S) : Fridolin Bäbler et al.

It is certified that error appears in the above-identified patent and that said Letters Patent is hereby corrected as shown below:

Title page,
Item [60], Related U.S. Application Data, should read
-- Related U.S. Applicaton Data
[60] Provisional application No. 60/429,780, filed Nov. 27, 2002. --.

Signed and Sealed this

Twenty-eighth Day of June, 2005

JON W. DUDAS
*Director of the United States Patent and Trademark Office*